United States Patent [19]

Uchida

[11] 4,219,268
[45] Aug. 26, 1980

[54] DEVICE FOR ELECTRONIC-FLASH PROXIMITY PHOTOGRAPHY

[75] Inventor: Yasuo Uchida, Hachioji, Japan

[73] Assignee: Konishiroku Photo Industry Co., Ltd., Tokyo, Japan

[21] Appl. No.: 970,645

[22] Filed: Dec. 18, 1978

[30] Foreign Application Priority Data

Dec. 19, 1977 [JP] Japan .................................. 52-151692

[51] Int. Cl.² ........................................... G03B 17/00
[52] U.S. Cl. ..................................... 354/293; 354/81
[58] Field of Search ................ 354/126, 293, 295, 62, 354/139, 149, 81; 362/16, 323, 325, 354.25, 357, 223, 225, 257, 279–281, 285, 290

[56] References Cited

U.S. PATENT DOCUMENTS

| | | | |
|---|---|---|---|
| 1,960,254 | 5/1934 | McCandless | 354/216 X |
| 3,270,652 | 9/1966 | Mason et al. | 354/81 X |
| 3,742,835 | 7/1973 | Bahnsen | 354/81 |

*Primary Examiner*—L. T. Hix
*Assistant Examiner*—Shelley Wade
*Attorney, Agent, or Firm*—Bierman & Bierman

[57] ABSTRACT

A camera support for electronic-flash proximity photography is formed from a substantially flat support having openings therethrough for the camera lens, the flash and for viewing the object to be photographed. The underside of the support carries three pivotally mounted extendible legs which in their extended position mount the camera above the object to be photographed, the ends of the legs being positioned in such a manner relatively to the lens opening as to effectively form two sides of a framing rectangle; in their retracted position these legs are attached to the underside of the support in a triangular manner about the lens opening. The support also preferably includes a light diffuser formed in the opening coincident with the flash.

3 Claims, 3 Drawing Figures

DEVICE FOR ELECTRONIC-FLASH PROXIMITY PHOTOGRAPHY

BACKGROUND OF THE INVENTION

Field of the Invention

The present invention relates to a device to be used for photographing an object disposed with a close distance to or in the proximity of a camera under the illumination of light produced by an electronic flash unit.

The proximity photographing under illumination by an electronic flash or the like in which an object to be photographed is positioned at a close distance to the camera has been widely performed heretofore. However, high skillfulness is required for establishing the proper illumination or for determining the optimum exposure in such photography.

In these years, development of camera having a built-in electronic flash unit and wide usability thereof make the photographing under the electronic flash illumination attractive for many persons who are not familiar with the photographic technology. In other words, there are many opportunities where man encounters the scenes to be photographed with electronic flash light in which an object is located closely to the camera. Under the circumstances, there arises a demand for the method of proximity photographing which allows any person to determine the optimum exposure in a facilitated manner.

SUMMARY OF THE INVENTION

An object of the invention is to meet such demand and provides a novel device to be used for proximity photographing as set forth in the claims.

In the following, the purpose of the invention will be described complementarily in conjunction with cameras, especially having built-in electronic flash unit of the structures such as disclosed in Laid-Open Utility Model No. 24238/1976 and Laid Open Patent No. 24224.1964, both by the applicant of the present application.

The application which is first conceivable for the proximity photographing by using the camera of the above type will be a simple case where an object lying closely to the camera is to be photographed merely by attaching an auxiliary lens to the lens assembly of the camera.

However, since the light quantity as well as illuminating direction of the electronic flash unit are usually so designed to be suited for the photography of the objects lying in an intermediate range, for example 1 to 3 meters, the electronic flash illumination to the object in the proximity will involve too intensive irradiation for the object to be properly exposed, especially in a portion of the scene located near to the flash light source.

In other words, light distribution becomes uneven and besides produces a glistening portion in the developed image. The uneven light distribution may be prevented by varying the projected direction of the electronic flash light rays as a function of the distance to the object.

However, the problem of the photographed image tending to become glistening and tending to be flattened remains to be solved.

According to the teaching of the invention, the distance to the object as well as the range of the field for the proximity photographing are determined by making use of a tripod apparatus to which the camera is mounted, wherein the iris aperture of the diaphragm is determined in dependence on the preset distance thereby to attain an optimum exposure primarily by the electronic flash at the preset distance and range and the predetermined iris aperture, while light attenuating means having the ability to make the light distribution uniform on the object are provided in front of the electronic flash unit. According to the invention, the inconveniencies as well as the drawbacks of the hitherto known proximity photography can be eliminated in a satisfactory manner.

In the following, the invention will be described in conjunction with a preferred embodiment shown in the accompanying drawings.

DETAILED DESCRIPTION OF THE PREFERRED EMBODIMENTS

Figure 1:
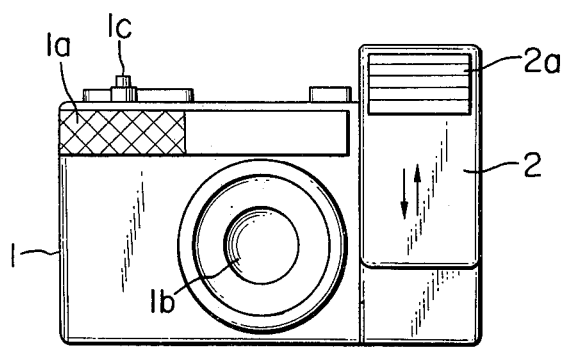
FIG. 1 is a front view showing an example of a photographic camera which the invention concerns.

Referring to FIG. 1, reference numeral 1 denotes a camera of a substantially same construction as those disclosed in the specifications of Laid-Open Utility Model Application Exposure No. 24238/1976 and Laid-Open Patent Application Exposure No. 24224/1976 in Japan.

The camera 1 has a light receiving portion 1a of an auto exposure adjusting apparatus (generally called as EE type exposure adjusting apparatus) known in the art, an objective lens assembly 1b, and an electronic unit 2 adapted to be projected upwardly to an operative position and having a light emitter portion 2a.

A shutter release button is denoted by 1c. When the electronic flash unit 2a is set to the projecting position shown in the drawing (see FIGS. 1 and 3), a trigger switch for the electronic flashing circuit is closed and at the same time the diaphragm mechanism of the lens assembly 1b is changed over from a position controlled by the E - F type exposure adjusting apparatus to a position to be controlled by a range-diaphragm interlocking mechanism.

Figure 2:
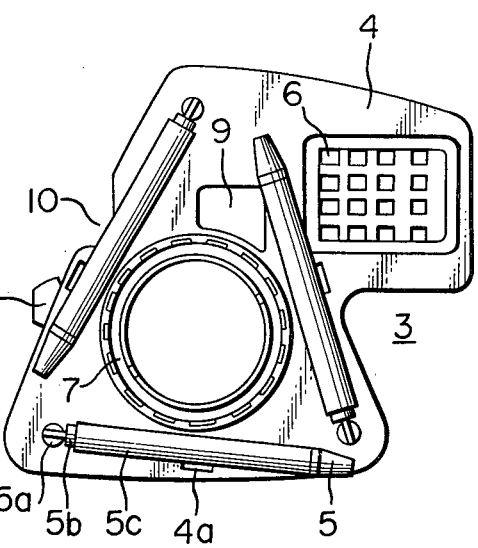
FIG. 2 is a front view showing an exemplary embodiment of an apparatus used in carrying out the method according to the invention.

Accordingly, by setting the electronic flash unit 2a to the projected position and focussing the lens to an object to be photographed, a normal flash photographing can be effected automatically with optimum exposure by pressing the release button 1c. In the drawings, FIGS. 2 and 3 are respectively a front view and a side view to show a tripod apparatus which allows the method according to the present invention to be executed in a facilitated manner by using the camera 1 of the structure described above without requiring any special skill.

Figure 3:
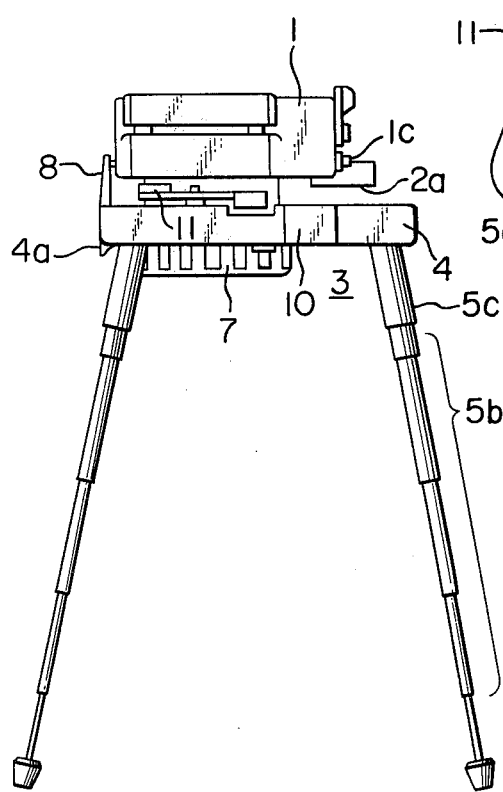
FIG. 3 is a side view of the same.

In FIG. 3, the camera 1 is shown mounted on the support or tripod apparatus.

The tripod apparatus generally denoted by numeral 3 is composed of mounting platform 4 on which the camera 1 is mounted fixedly, the platform having extensible and foldable legs 5. Each of the legs 5 is composed of a base portion 5a fixedly secured to the mounting platform 4 so as to definitely determine the direction in which each supporting leg 5 is moved to the expanded position, an extensible leg member 5b pivotally connected to the base portion 5a rotatably in the folding and unfolding directions, and a sleeve 5c mounted telescopically on the leg member 5b. The sleeve 5c is adapted to be fitted around the base portion 5a at the expanded position of the leg member 5b, whereby the latter is held stationarily at the expanded position in the direction determined by the pivotal connection to the base portion 5a. The expanded direction of the leg members 5a of the tripod apparatus 3 are so selected that two of the leg members 5b which are aligned in a direction parallel to the bottom plane of the camera 1 mounted on the platform 4 at the predetermined position form a line which defines the long side of a framed rectangular field, while the third leg member determines the short sides of the framed field by a line extending therefrom and intersecting the first line at right angle thereto.

In other words, the size of the framed rectangular field to be photographed is determined on two sides by a rectangular area defined by the expanded leg members 5b. The extension of the extensible leg member 5b may be effected stepwise by a length corresponding to that of the telescopically fitted elements constituting the leg member 5b or by a length determined by click stopper means in correspondence to the range marker indication of the camera 1 thereby to vary the magnification for the approached or proximity photographing. By focussing the lens of the camera 1 to the object to be photographed by adjusting the length of the extensible leg members 5, the camera 1 is set to the iris aperture corresponding to the range marker indication, whereby the conditions for exposure are maintained constant relates to the extended length of the leg members 5b. Regardless of the fact that the magnification is varied by varying the length of the extensible leg members 5b, the framesize of field still is determined by the expansion of the leg members 5b at any length thereof.

According to another feature of the invention, a light intensity attenuation means exhibiting a uniformly distributing function is provided in front of the light emitting portion of the electronic flash unit 2a.

With such provision of the light intensity attenuation means, when the camera is so conditioned that an optimum exposure can be accomplished at the full iris aperture of the diaphragm given by the range marker indication of the camera 1 corresponding to an extended length of the leg member 5b, for example, then the photographing at close distance to the object under the illumination by the electronic flash unit can be effected also at the optimum exposure automatically simply by focussing the lens to the object, even when the length of the leg members 5b is changed to vary the magnification. The light intensity attenuation means is denoted by reference numeral 6 and is provided on the mounting platform 4 to be positioned in front of the light emitting portion 2a of the electronic flash unit 2 when the camera 1 is mounted on the platform 4. The light intensity attenuation means 6 comprises a plurality of windows so arrayed that light transmitting cross-section thereof is decreased progressively as the distance from the optical axis of the lens 1b, as a result of which the object is illuminated with a uniformly distributed light flux.

For mounting the camera 1 onto the mounting platform 4, a mounting ring 7 for mounting an auxiliary lens for the proximity photographing is rotatably mounted on the mounting platform 4. A thread is formed in the mounting ring 7 for threadedly engaging with a threaded groove formed in the lens assembly of the camera and intended inherently for mounting a filter ring. Thus, the camera 1 can be fixedly mounted on the platform 4 by rotating the mounting ring 7 so that the thread formed therein is fittingly engaged by the thread formed in the lens assembly at the front end thereof. Reference numeral 8 denotes a foldable plate for determining the mounting position of the camera, which positioning plate 8 lies along the rear face of the mounting platform 4 in the unused state. Upon mounting the camera 1 on the platform 4, the positioning plate 8 is raised to the position shown in FIG. 3 for maintaining the camera at a predetermined constant position relative to the mounting platform 4.

Further, the positioning plate 8 serves to support the camera 1, when the photographing is performed with the tripod apparatus being disposed in an inclined or a horizontally laid position, as held by hand. Thus, any unwanted stress is prevented from being produced on the engaging portion of the camera and the mounting ring 7. Additionally, a ranging device (not shown) can be provided on the mounting platform 4. Further, a window 9 corresponding to a viewing window of a finder of the camera as well as a notch 10 are provided in the mounting platform 4, so that the object to be photographed can be observed through the camera. The folded and contracted leg members 5 are adapted to be held by means of respective holding projections 4a. Numeral 11 denotes a rotatable lever adapted to bear against an end face of the positioning plate 8 in the folded position to latch the latter in this position.

As will be appreciated from the foregoing description, according to the teaching of the invention, a camera having a built-in electronic flash unit and incorporating a range-diaphragm interlocking device is combined with a tripod which is so designed as to determine the distance to the object to be photographed as well as the field thereof, while a light intensity attenuation means is provided at a position in front of the flash lamp and operative to distribute the flash light rays uniformly on the object with a proper attenuation of the light intensity. With such arrangement, it is possible to establish a constant optimum exposure by focussing the lens to the object independently from variation in the magnification, as the result of which even those unfamiliar with the use of the camera may enjoy themselves with the proximity photographing under the illumination of the electronic flash lamp without failure.

For carrying out the invention, the camera may be of the type requiring an auxiliary lens for the proximity photographing or of the type requiring only an auxiliary ring without lens or alternatively of the type which requires neither the auxiliary lens nor ring.

A camera may be of the type mounting a flash devece. Further, the invention is never restricted to the illustrated embodiment. The tripod may be of a stationary type, the attenuation means having the uniformly distributing function may be constituted by a filter provided with an attenuating graduation, and the camera may be mounted at the lens barrel thereof without departing from the spirit and scope of the invention.

However, it should be mentioned that the illustrated structure of the supporting tripod apparatus is advantageous in respect of handling and portability.

The mounting platform may be made of a plastic material by molding simultaneously with the formation of the view window and notch at a reasonably low expenditure.

What is claimed is:

1. A tripod assembly adapted to support a camera for photographing an object closely located thereto, said assembly comprising a platform having means for mounting the camera on its upper surface and above the object, said platform having a first opening for receiving the camera lens, and a second opening for viewing the object below, and three vertically adjustable legs pivotally mounted to the underside of said platform, the pivots being so positioned that the lower ends of said legs when extended and as seen from above form two sides of a definable rectangular frame with respect to the object, one side of said frame being formed by a straight line connecting the ends of two of said legs and the second side being formed by a line drawn from the third leg and intersecting said first straight line at right angles thereto, while at the same time the extended length of said legs determines the distance between the camera and the object to be photographed, and means holding said legs to the underside of said platform in their retracted and nonextended position parallel to and within the surface area of said platform and about said first opening.

2. A tripod assembly according to claim 1, in which said platform is provided with a third opening, adapted to coincide with the flash unit of the camera, and light attenuating means mounted in said opening to decrease the light from the flash unit.

3. A tripod assembly according to claim 1, in which said last means holds said legs to the underside of said platform in a triangular configuration about said first opening.

* * * * *